United States Patent Office 2,906,769
Patented Sept. 29, 1959

2,906,769
O-(CHLOROPHENYL) O-METHYL S-ARYL PHOSPHORODITHIOATES

Harold R. Slagh, Midland, Mich., assignor to The Dow Chemical Company, Midland, Mich., a corporation of Delaware No Drawing. Application April 4, 1956
Serial No. 575,963

6 Claims. (Cl. 260—461)

This invention is concerned with the O-(chlorophenyl) O-methyl S-aryl phosphorodithioates having the formula $$R-O-P\underset{S-X}{\overset{S}{\underset{\|}{\diagup}}}OCH_3$$

In this and succeeding formulas, R represents a chlorophenyl radical and X represents an aryl radical selected from the group consisting of phenyl, chlorophenyl and methoxyphenyl. The new compounds are viscous liquids, somewhat soluble in many organic solvents and of very low solubility in water. They have been found to be active as parasiticides and are adapted to be employed as active toxic constituents of compositions for the control of bacteria, mites and insect organisms such as the Mexican bean beetle and house flies.

The new compounds may be prepared by reacting an alkali metal salt of a benzenethiol of the formula X—S—Alkali metal with an O-(chlorophenyl) O-methyl phosphorochloridothioate of the formula $$R-O-P\underset{Cl}{\overset{S}{\underset{\|}{\diagup}}}O-CH_3$$

The reaction is carried out in an inert organic solvent such as benzene, toluene, carbon tetrachloride, methanol or ethanol. Good results are obtained when employing substantially equimolecular proportions of the reactants. In practice, the salt employed is preferably the sodium salt of the benzenethiol and may be prepared by reacting the corresponding benzenethiol with sodium. The salt may be prepared as a solution in ethanol or in one of the other previously mentioned solvents. The reaction between the benzenethiol and phosphorochloridothioate reagents is somewhat exothermic and takes place readily at temperatures of from −10° to 50° C. The temperature may be controlled by regulation of the rate of contacting the reactants and by external cooling. Upon completion of the reaction, the desired product may be separated in conventional fashion.

In carrying out the reaction, the alkali metal salt of the benzenethiol, preferably the sodium salt, is contacted portionwise with the phosphorochloridothioate reagent dissolved in the reaction solvent. The contacting of the reagents is carried out with stirring and at a temperature of from −10° to 50° C. Upon completion of the reaction, the solvent may be removed by evaporation, the residue dissolved in a water-immiscible solvent such as benzene or methylene dichloride and the solvent solution washed with water. The solvent is then removed by evaporation or fractional distillation under reduced pressure to obtain the desired product as a liquid residue.

The following examples illustrate the invention but are not to be construed as limiting.

EXAMPLE 1

*O-(2-chlorophenyl) O-methyl S-phenyl phosphorodithioate*

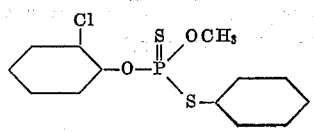

Benzenethiol (11 grams, 0.1 mole) and 2.3 grams (0.1 mole) of sodium were dissolved in 150 milliliters of ethanol to prepare an ethanol solution of the sodium salt of benzenethiol. This solution was added portionwise with stirring to 25.7 grams (0.1 mole) of O-(2-chlorophenyl) O-methyl phosphorochloridothioate. The addition was carried out in 45 minutes and at a temperature of from 5° to 10° C. Following the addition, the mixture was heated at from 40° to 45° C. for one hour to complete the reaction. The ethanol was then removed by evaporation and the residue diluted with benzene and washed with water. Upon evaporation of the solvent, there was obtained an O-(2-chlorophenyl) O-methyl S-phenyl phosphorodithioate product as a pale yellow liquid having a refractive index n/D of 1.5641 at 25° C.

EXAMPLE 2

*O-(4-chlorophenyl) O-methyl S-phenyl phosphorodithioate*

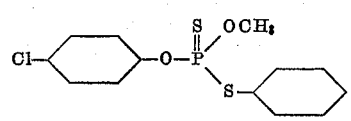

This compound was prepared in a manner similar to that described in Example 1 by the reaction of equimolecular proportions of O-(4-chlorophenyl) O-methyl phosphorochloridothioate and the sodium salt of benzenethiol in the presence of ethanol. The reaction mixture was processed as described in the preceding example to obtain an O-(4-chlorophenyl) O-methyl S-phenyl phosphorodithioate product as a colorless liquid having phosphorus, sulfur and chlorine contents of 6.65 percent, 13.88 percent and 11.14 percent, respectively.

EXAMPLE 3

*O-(2-chlorophenyl) O-methyl S-(4-chlorophenyl) phosphorodithioate*

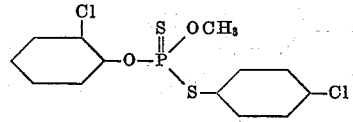

4-chlorobenzenethiol (14.45 grams, 0.1 mole) and 2.3 grams (0.1 mole) of sodium were dissolved in 150 milliliters of ethanol to prepare an ethanol solution of the sodium salt of 4-chlorobenzenethiol. This solution was added portionwise with stirring to 25.7 grams (0.1 mole) of O-(2-chlorophenyl) O-methyl phosphorochloridothioate. The addition was carried out in one hour and at a temperature of from 5° to 10° C. Following the addition, the mixture was heated at 35° to 38° C. for 1.5 hours to complete the reaction. The reaction mixture was then processed as described in Example 1 to obtain an O-(2-chlorophenyl) O-methyl S-(4-chlorophenyl) phosphorodithioate product as a light yellow liquid having a specific gravity of 1.3074 at 25° C. and a refractive index n/D of 1.5689 at 25° C.

EXAMPLE 4

*O-(4-chlorophenyl) O-methyl S-(4-chlorophenyl) phosphorodithioate*

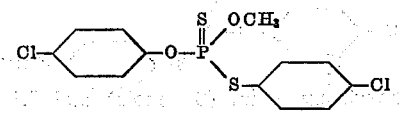

4-chlorobenzenethiol (14.45 grams, 0.1 mole) and 2.3 grams (0.1 mole) of sodium were dissolved in 150 milliliters of methanol to prepare a methanol solution of the sodium salt of 4-chlorobenzenethiol. This solution was added portionwise with stirring to 25.7 grams (0.1 mole) of O-(4-chlorophenyl) O-methyl phosphorochloridothioate. The addition was carried out in one hour and at a temperature of from 5° to 10° C. Following the addition, the mixture was heated at from 30° to 40° C. for three hours to complete the reaction. The reaction mixture was then processed as described in Example 1 to obtain an O-(4-chlorophenyl) O-methyl S-(4-chlorophenyl) phosphorodithioate product as a light yellow liquid having a specific gravity of 1.3276 at 25° C. and a refractive index n/D of 1.5750 at 25° C.

EXAMPLE 5

*O-(2,4,5-trichlorophenyl) O-methyl S-(4-chlorophenyl) phosphorodithioate*

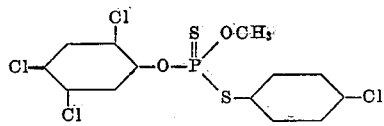

4-chlorobenzenethiol (0.1 mole) and 0.1 mole of sodium were dissolved in 150 milliliters of methanol to prepare a methanol solution of the sodium salt of 4-chlorobenzenethiol. This solution was added portionwise with stirring to 32.6 grams (0.1 mole) of O-(2,4,5-trichlorophenyl) O-methyl phosphorochloridothioate dissolved in 50 milliliters of benzene. The addition was carried out in one hour and at a temperature of from 0° to 10° C. Following the addition, the mixture was heated at from 30° to 35° C. for 1.5 hours to complete the reaction. The reaction mixture was then processed as described in Example 1 to obtain an O-(2,4,5-trichlorophenyl) O-methyl S-(4-chlorophenyl) phosphorodithioate product as a viscous, almost colorless liquid having a specific gravity of 1.5598 at 25° C. and a refractive index n/D of 1.5898 at 25° C.

EXAMPLE 6

*O-(2-chlorophenyl) O-methyl S-(4-methoxyphenyl) phosphorodithioate*

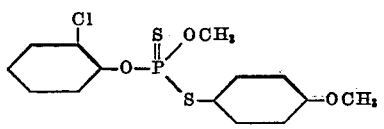

4-methoxybenzenethiol (0.1 mole) and 0.1 mole of sodium were dissolved in 150 milliliters of ethanol to prepare an ethanol solution of the sodium salt of 4-methoxybenzenethiol. This solution was added portionwise with stirring to 25.7 grams (0.1 mole) of O-(2-chlorophenyl) O-methyl phosphorochloridothioate. The addition was carried out in 45 minutes and at a temperature of from 5° to 10° C. After the addition, the mixture was heated at 38° to 40° C. for 1.5 hours to complete the reaction. The reaction mixture was then processed as described in Example 1 to obtain an O-(2-chlorophenyl) O-methyl S-(4-methoxyphenyl) phosphorodithioate product as a light yellow liquid having a specific gravity of 1.2654 at 25° C. and a refractive index n/D of 1.5750 at 25° C.

EXAMPLE 7

*O-(2,4-5-trichlorophenyl) O-methyl S-(4-methoxyphenyl) phosphorodithioate*

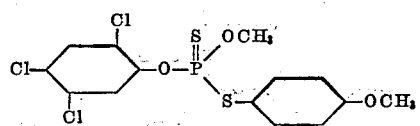

4-methoxybenzenethiol (0.1 mole) and 0.1 mole of sodium were dissolved in 150 milliliters of methanol to prepare a methanol solution of the sodium salt of 4-methoxybenzenethiol. This solution was added portionwise with stirring to 32.6 grams (0.1 mole) of O-(2,4,5-trichlorophenyl) O-methyl phosphorochloridothioate dissolved in 50 milliliters of benzene. The addition was carried out in 30 minutes and at a temperature of from 0° to 5° C. Following the addition, the mixture was heated at from 35° to 40° C. for two hours to complete the reaction. The reaction mixture was then processed as described in Example 1 to obtain an O-(2,4,5-trichlorophenyl) O-methyl S-(4-methoxyphenyl) phosphorodithioate product as a viscous liquid having a specific gravity of 1.4360 at 25° C. and a refractive index n/D of 1.5962 at 25° C.

The new O-(chlorophenyl) O-methyl S-aryl phosphorodithioates are effective as parasiticides and are adapted to be employed for the control of household and agricultural pests. For such use the products may be dispersed on a finely divided carrier and employed as dusts. The new products may also be employed in oils, as constituents in water emulsions or in water dispersions. In a representative operation 100 percent control of house flies has been obtained with aqueous compositions containing 100 parts by weight of O-(2,4,5-trichlorophenyl) O-methyl S-(4-chlorophenyl) phosphorodithioate per million parts by weight of aqueous composition.

The O-(chlorophenyl) O-methyl phosphorochloridothioates employed as starting materials may be prepared by the reaction at a temperature of from 20° to 90° C. of substantially equimolecular proportions of sodium methylate and an O-(chlorophenyl) phosphorodichloridothioate. In carrying out the reaction, a methanol solution of the alcoholate is added portionwise to the phosphorodichloridothioate reagent dispersed in methanol. This operation is carried out with stirring and at the reaction temperature. Following the reaction, the reaction mixture is washed with water to obtain the desired starting material as a liquid residue.

I claim:

1. An O-(chlorophenyl) O-methyl S-aryl phosphorodithioate having the formula

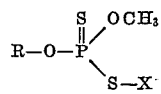

in which R represents a chlorophenyl radical and X represents an aryl radical selected from the group consisting of phenyl, chlorophenyl and methoxyphenyl.

2. O-(2-chlorophenyl) O-methyl S-phenyl phosphorodithioate.

3. O-(4-chlorophenyl) O-methyl S-(4-chlorophenyl) phosphorodithioate.

4. O-(2,4,5-trichlorophenyl) O-methyl S-(4-chlorophenyl) phosphorodithioate.

5. O-(2,4,5-trichlorophenyl) O-methyl S-(4-methoxyphenyl) phosphorodithioate.

6. O-(2-chlorophenyl) O-methyl S-(4-methoxyphenyl) phosphorodithioate.

References Cited in the file of this patent

UNITED STATES PATENTS

| | | |
|---|---|---|
| 1,685,444 | Zelger | Sept. 25, 1928 |
| 2,506,344 | Cleary | May 2, 1950 |
| 2,542,604 | Weisel et al. | Feb. 20, 1951 |
| 2,656,373 | Gamrath | Oct. 30, 1953 |
| 2,690,450 | Gilbert et al. | Sept. 28, 1954 |

OTHER REFERENCES

Melnikov: "J. Gen. Chem. U.S.S.R.," 23, 1419–1423 (1953). (English translation.)